United States Patent Office 3,165,300
Patented Jan. 12, 1965

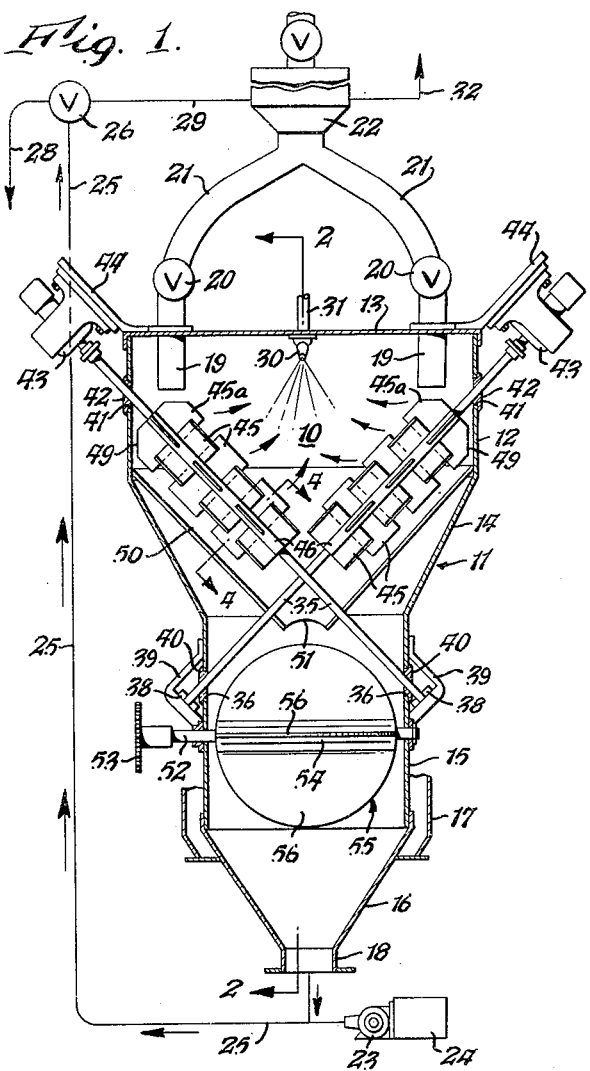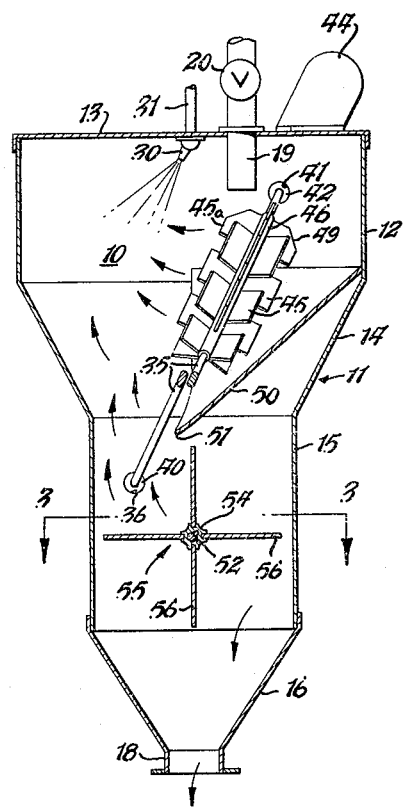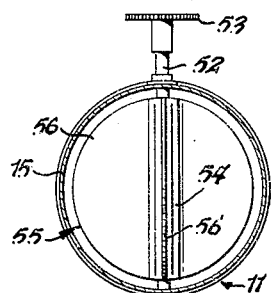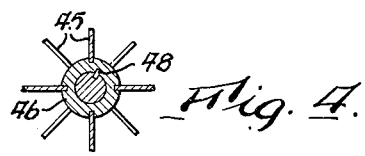

3,165,300
METHOD AND APPARATUS FOR MIXING AND BLENDING SOLID MATERIALS
Peter A. Balistrieri, 1412 S. Park Ave., Buffalo 20, N.Y.
Filed Aug. 3, 1960, Ser. No. 47,222
12 Claims. (Cl. 259—6)

This invention relates to a method and apparatus for mixing or blending solid materials in discrete or particle form by collision of the particles of the materials to be mixed with one another while in a suspended or free falling state in a body of air or other gas with the particles separated from one another, thereby to effect intimate and uniform mixing of the particles rapidly and thoroughly.

This application is a continuation-in-part of my copending application, now abandoned, Serial No. 661,254, filed May 23, 1957 for Mixing Apparatus.

In the preferred embodiment of the invention the mixing chamber contains a body of air in which the mixing takes place and the materials to be mixed, in discrete or particle form, enter at the top, then are guided by inlet spouts against rotating groups of paddles which are arranged to drive the particles through the air to place them individually in moving suspension in the air driving them in a cross pattern into collision with one another and also upwardly to recycle and retain materials in the mixing zone and to control the rate and degree of mixing. The discrete materials in the mixing chamber are dispersed in the form of a cloud, the materials darting horizontally and upwardly under the impact of the paddles and descending by gravity to the bottom of the mixing chamber where they pass out of the mixing chamber, no part remaining inside. This constitutes a continuous process. A part of the materials can be recycled, or all of the materials can be recycled in a batch process. The paddles are preferably arranged to drive the particles into direct opposition with one another to increase the intimacy and uniformity of mixing.

The principal object of the present invention is to provide a method and apparatus for mixing discrete solid materials in which the materials to be mixed are rapidly brought into intimate intermingled relation to one another to effect thorough mixing rapidly and uniformly.

Another object is to provide such a method and apparatus in which the materials are not appreciably heated as a function of their being mixed.

Another object is to provide such a method and apparatus in which the materials can be cooled, heated or otherwise conditioned while being mixed.

Another object is to provide such a method and apparatus which is particularly adaptable to materials of widely varying specific gravity, such materials all falling through the mixing chamber at substantially the same rate so as to be uniformly distributed in the mix.

Another object is to provide such a method and apparatus in which the materials being mixed cannot gather or lie on any part of the mixing chamber, the mixing being effected in a suspension in a volume of air and the materials being projected to the center of this volume of air.

Another object is to achieve a high degree of dispersion and rapid movement of the materials being mixed, the materials existing as a mist-like cloud of darting particles in the mixing chamber.

Another object is to isolate bearings and other wearing parts from the mixing chamber and the materials being mixed therein.

Another object is to provide such a method and apparatus in which there is an internal recycling in the mixing chamber, the impact paddles being arranged to return the particles to a higher elevation in the mixing chamber as well as to drive them into collision with other particles.

Another object is to provide such a method and apparatus in which all of the functions are readily regulatable to suit the particular materials being mixed as well as the speed and degree of mixing desired.

Another object is to provide such a method and apparatus which can be adapted to otherwise condition the materials while being mixed, such as heating or cooling, drying or humidifying, moisturizing or mixing in an inert or reactive atmosphere.

Another object is to provide such a method and apparatus which is adapted for continuous flow or batch processing and in which any part of the materials can be recycled.

Another object is to provide such a method and apparatus having low power requirements.

Another object is to provide such apparatus which is of simple and low-cost construction and will stand up under conditions of severe and constant use without getting out of order or requiring repair.

Other objects and advantages of the invention will be apparent from the following description and drawings in which:

FIG. 1 is a vertical central section through a mixer embodying the present invention, some accessory equipment being represented diagrammatically.

FIG. 2 is a vertical central section taken generally along line 2—2, FIG. 1.

FIG. 3 is a horizontal section taken along line 3—3, FIG. 2.

FIG. 4 is an enlarged section taken generally on line 4—4, FIG. 1.

The mixing is effected in a mixing chamber or zone 10 provided by a vertical tubular shell 11, the mixing chamber or zone containing air, although it will be understood that it could be filled with an inert or a reactive gas if the materials being mixed would render the use of such gases desirable. This shell could be of any shape but desirably has a larger diameter upper cylindrical portion 12 provided with a cover 13 at its top and a downwardly diminishing conical portion 14 at its bottom, a smaller diameter cylindrical portion 15 forming a downward continuation of the smaller lower end of the conical portion 14, and a downwardly diminishing conical portion 16 leading to a discharge duct or spout 18.

An important feature of the invention resides in the provision of means introducing the discrete solid materials to be mixed to fall freely by gravity through the air contained in the chamber 10 and in a dispersed or widely scattered condition so that the particles are free to dart about and to move upwardly countercurrent to the overall flow of materials. To this end vertical inlet spouts 19 project downwardly through diametrically opposite sides of the cover 13 and through which the materials to be mixed are introduced at a controlled rate to achieve such dispersion, for which purpose valves 20 can be provided in each of these spouts. These inlet spouts can form the lower end of branches 21 leading from a hopper 22 containing the materials to be mixed. Alternatively, one spout 19 could be supplied with one type and the other with the other type of material to be mixed.

While the invention is not essentially concerned with secondary processing that can accompany the mixing operation, the shell 11 can be provided with a jacket 17 through which a heating or cooling medium can be circulated, and the material leaving the outlet spout 18 is shown as being led to the discharge of a blower 23 supplied with heated or cooled air from a heater or cooler 24. The discharge line 25 from the blower 23 is shown as leading to a valve 26 which is preferably a butterfly valve and which proportions the flow of the materials to a material discharge line 28 and to a recycling line 29 leading back to the hopper 22. The materials can also be wetted or moistened while being mixed by liquid sprayed from a downwardly and laterally directed nozzle 30 suspended from the center of the cover 13 and supplied from a supply line 31. The air from the blower can be vented at 32 when all or part of the material is being recirculated.

The invention is particularly concerned with impact or collision mixing of the discrete materials as they fall by gravity through the shell 11. To this end crossed shafts 35 are arranged in the mixing chamber 10. These shafts are shown as crossing each other at approximately the center of the lower reduced end of the conical portion 14 of the shell 11 and as being arranged about perpendicular to each other. These shafts are also shown as being on opposite sides of a common plane which is inclined at an acute angle with reference to the vertical, this angularity being preferably about the same as the corresponding angularity of the conical section 14 of the shell. The lower end of each shaft 35 extends through an opening 36 in the smaller diameter cylindrical portion 15 of the shell and is journalled in a bearing 38 arranged externally of the shell and supported by a bracket 39. By this external arrangement of these bearings they are completely isolated from contacting the materials being mixed, dust seals 40 being preferably provided over each opening 36.

The upper end of each shaft 35 projects through an opening 41 in the top or larger cylindrical portion 12 of the shell 11, these openings also being provided with dust seals 42. The upper extremity of each shaft 35 is shown as coupled to the shaft of an electric motor 43 although suitable reducing gearing (not shown) could also be provided. Each motor is supported by a bracket 44 and by being arranged externally of the mixing chamber 10 is isolated from the materials being mixed.

Each of the shafts 35 has secured thereto in axially spaced relation a plurality of blades or paddles 45. The blades or paddles for each shaft have a common tubular hub 46 keyed to its shaft as indicated at 48. The paddles or blades 45 are shown as being in the form of rectangular metal plates secured in diametrically opposite pairs to project radially from the hub 46, each pair in a common plane which includes the axis of the shaft 35. The top plates, indicated at 45a, are each shown as having one corner cut away to provide an edge 49 which sweeps close to the corresponding side of the cylindrical top portion 12 of the shell 11. The successive pairs of paddles 45, 45a are arranged to overlap as shown.

The material inlet spouts 19 are shown as being directly above these blades or paddles 45a and discharge against those faces of these paddles which are travelling toward the center of the chamber 10 so that the incoming materials are immediately driven upwardly and toward the center of the mixing chamber in a cross pattern by these top paddles 45a.

An inclined baffle or chute 50 is arranged in the mixing chamber 10 under the paddles 45, 45a. This baffle or chute is preferably in the form of a segment of a cone having its upper edge fixed to the top cylindrical portion 12 of the shell 11 and diminishing downwardly to discharge 51 arranged at the center of the mixing chamber 10 at the top of the lower smaller diameter portion 15 of the shell 11.

In this lower smaller diameter portion 15 of the shell 11 is also arranged a centered horizontal shaft 52 extending through diametrically opposite parts and journalled in bearings mounted on the exterior of the wall thereof. This shaft can be driven by a sprocket 53 fixed thereto and within the mixing chamber 10 carries the hub 54 of a paddle wheel 55. The blades 56 of this paddle wheel are shown as being in the form of four semicircular flat plates having thin straight edges fixed to the hub 54 and projecting radially so that their curved edges sweep close to the cylindrical portion 15 of the shell 11. This paddle wheel 55 rotates clockwise as viewed in FIG. 2 so that the material falling into the lower smaller diameter portion 15 of the shell 11 is largely driven upwardly back into the upper portions 12 and 14 of the shell.

*Operation*

The discrete solid particles to be mixed are shown as contained in hopper 22 as flowing in two streams to the spouts 19, the rate being controlled by the valves 20 so as to maintain the materials in a free falling, cloud-like dispersion in the mixing chamber 10. The materials are guided accurately by the spouts 19 to fall upon the center portions of the paddles 45a and to strike the faces of these paddles which are moving upwardly and toward the center of the mixing chamber. As a result the particles are projected with dart-like velocity toward the center of the mixing chamber from the opposite sides thereof and these particles collide with one another and rebound irregularly. At the same time these particles are falling by gravity, the rate of fall therefore being the same for light bulky materials as for dense heavy materials. As the materials descend they encounter the paddles 45 and by virtue of the slopes much of the material encounters the rising sides of these paddles 45 and is again driven upwardly and toward the center of the mixing chamber to again collide with other material darting around therein and to become thoroughly commingled therewith. Material escaping to the chute 50 or falling through the open throat at the bottom of this chute, encounters the rising blades 56 of the paddle wheel 55 therebelow and are largely driven upwardly through this throat into the upper portions 12, 14 of the shell to again collide with other particles darting around therein.

That part of the material carried around by the paddle wheel 55 falls through the conical portion 16 and discharge spout 18 of the casing into the discharge of the air blower 23 which projects the material through the line 25 and valve 26 to the material discharge 28, if this valve is set for one pass mixing.

If the valve is set for recycling all or part of the material will be delivered through the line 29 back to the hopper, the air being vented at 32.

Auxiliary processing can be carried on in conjunction with the above collision mixing. Thus liquid in spray form such as dyestuffs and chemicals, or powders, can be introduced into the center of the melee from the nozzle 30 which is preferably directed away from the paddles 45, 45a. Heating or cooling media can be passed through the jacket 17. The air to the blower 23 can be precooled or preheated in 24. Also, of course, the invention contemplates mixing in an inert or in a reactive gas instead of air.

Also, of course, the product could be discharged directly from the discharge spout 18, the blower being exemplary of the use of the mixer for light materials, particularly where recycling is required.

From the foregoing it will be seen that the present invention provides speedy and thorough mixing of discrete solids by a novel collision process while dispersed in suspension in a body of air and also achieves the various objectives set forth.

What is claimed is:

1. The method of mixing the particles of a stream of discrete solids in a body of gas, which comprises guiding two streams into the upper part of different sides of said body of gas in contact therewith at a rate to permit of dispersion of said particles out of contact with each other in said body of gas, striking the particles of each stream with positive force to separate them from one another and drive the separated particles of each stream horiontally and diagonally upwardly in a cross pattern through said body of gas to place them individually in free falling suspension in the gas and to drive them into headon collision with the particles of the other stream, permitting said particles to descend by gravity through said body of gas, successively striking the free falling particles with positive force at successively lower elevations from opposite sides of said body of gas horizontally into collision with one another to rebound and create a cloud of irregularly darting particles and removing the mixed rebounding particles colliding while in said suspension in said gas from said body.

2. Apparatus for mixing the particles of discrete solids in a dispersion falling by gravity through a body of a gas, which comprises means forming a mixing chamber filled with said body of gas, means guiding a stream of said discrete solids to fall downwardly into the upper part of said chamber at one side thereof at a rate to permit of dispersing said particles out of contact with one another in said mixing chamber, a first movable paddle in said chamber in the path of said guided stream, means moving said first paddle to strike said stream with positive force to the opposite side thereof and drive the particles thereof in a near horizontal and upward diagonal direction across said chamber and disperse them in moving free falling suspension out of contact with one another in said body of gas, a second movable paddle in the opposite side horizontally of said chamber from said first paddle, and means moving said second paddle to strike said horizontally moving free falling particles with positive force and drive them horizontally toward the center of said chamber into headon collision with the particles driven by impact from said first moving paddle to rebound therefrom and create a cloud of irregularly darting rebounding particles colliding while in suspension in said gas at the center of said chamber.

3. Apparatus for mixing the particles of discrete solids in a dispersion settling by gravity through a body of gas, which comprises means forming a mixing chamber containing said body of gas, means projecting two horizontally spaced streams of said discrete solids into the upper part of said chamber at a rate to permit of dispersing said particles of both streams out of contact with one another in said mixing chamber, a pair of shafts in said chamber revolving about axes which incline downwardly and horizontally and the upper ends of said shafts being severally arranged adjacent said projected streams, a series of paddles along each of said shafts with certain of said paddles in the path of the corresponding projected stream, means rotating said shafts and paddles in the direction to drive the particles of each stream both horizontally and upwardly into collision with the particles of the other stream to rebound therefrom and create a cloud of irregularly darting particles, a generally horizontal shaft in a lower part of said chamber, paddles on said last mentioned shaft in the path of the descending cloud of particles, and means rotating said last mentioned shaft and its paddles to drive particles in the lower part of said descending cloud back into the upper part thereof and into collision with the particles thereabove to again rebound and dart around irregularly.

4. Apparatus for mixing the particles of discrete solids in a dispersion falling by gravity through a body of gas contained in a chamber which comprises a pair of shafts in said chamber revolving about axes which incline downwardly toward each other and toward the center of said chamber, a series of paddles along each of said shafts, means rotating said shafts to move the rising faces of said paddles toward the center of said chamber at a speed sufficient to drive the solids contacting said faces diagonally upwardly across said chamber, means guiding a stream of discrete solids to fall downwardly into the upper part of said chamber at a rate to permit of dispersing said particles out of contact with each other in said mixing chamber, said guiding means guiding said stream to fall onto said faces of said paddles on one shaft which faces are rising toward the center of said chamber thereby to drive the particles into collision with the paddles of the other shaft and into collision with the particles being returned by the paddles of said other shaft to create a cloud of irregularly darting particles colliding while in suspension in gas at the center of said chamber.

5. Apparatus as set forth in claim 4 wherein successive series of paddles of said one shaft are alternately in different angular relation to one another to cause them to act in sequence on the particles of said stream.

6. Apparatus as set forth in claim 5 wherein each of said series of paddles extends in overlapping relation to the adjacent series of paddles.

7. Apparatus as set forth in claim 4 including a generally horizontal shaft in the lower part of said chamber, paddles on said last mentioned shaft having faces arranged to rise in the area of the descending cloud of particles, and means rotating said last mentioned shaft to effect said rising movement of said faces of the paddles thereon and drive the particles settling into the lower part of said descending cloud back into the upper part thereof and into collision with the particles thereabove to again rebound and dart around irregularly.

8. Apparatus as set forth in claim 7 additionally including a chute below said shafts guiding the particles onto said rising faces of the paddles on said last mentioned shaft.

9. Apparatus for mixing the particles of discrete solids in a dispersion falling by gravity through a body of gas, which comprises a pair of shafts in said chamber arranged to revolve about axes which incline downwardly toward each other and toward the center of said chamber, a series of paddles along each of said shafts, means rotating said shafts to move said paddles at a speed sufficient to drive the solids contacting said paddles diagonally upwardly across said chamber, the uppermost of said paddles entering the streams during the sector of their movement upwardly and toward the center of the chamber thereby to drive the particles of each stream in near horizontal and upward direction toward the center of the chamber into free falling dispersion in said body of gas out of contact with one another and into collision with the particles of the other stream to rebound therefrom and create a cloud of irregularly darting particles colliding while in suspension in gas at the center of said chamber.

10. Apparatus as set forth in claim 9 wherein the successive series of paddles of each shaft are alternately in different angular relation to each other to cause them to act in sequence.

11. Apparatus as set forth in claim 10, wherein each of said paddles extends axially in overlapping relation to the adjacent series of paddles.

12. The method of mixing the particles of a stream of discrete solid particles in a body of gas, which comprises guiding at least one stream into the upper part and one side of said body of gas in contact therewith at a rate to permit of dispersion of said particles out of contact with one another in said body of gas, striking the particles of said stream from below and at one side with positive force to drive them upwardly and laterally across the center of said body of gas and to separate them from one another and to place them individually in free falling suspension, striking other of said particles at the opposite side of said body of gas from below and at that side with positive force to drive them upwardly and laterally across said center of said body of gas into headon collision with a part of said first mentioned driven particles, repeating said striking of said particles alternately from opposite sides of said body of gas with positive force as they descend through said body of gas to create a cloud of irregularly darting particles colliding while in said suspension in said body of gas, and removing the mixed particles from the bottom of said body of gas.

References Cited in the file of this patent

UNITED STATES PATENTS

| | | |
|---|---|---|
| 379,498 | Van Gelder | Mar. 13, 1888 |
| 1,177,666 | Wayling et al. | Apr. 4, 1916 |
| 1,782,177 | Richards | Nov. 18, 1930 |
| 2,178,750 | Garland | Nov. 7, 1939 |
| 2,522,936 | Ferguson | Sept. 19, 1950 |

FOREIGN PATENTS

| | | |
|---|---|---|
| 2,655 | Great Britain | Feb. 14, 1889 |
| 319,458 | Italy | July 11, 1934 |
| 539,592 | Great Britain | Sept. 17, 1941 |

OTHER REFERENCES

German printed application H 10,650, Oct. 13, 1955.